United States Patent [19]

Buck

[11] Patent Number: 4,580,470
[45] Date of Patent: Apr. 8, 1986

[54] SIDEWARD-LOCATED BAR PULLER

[76] Inventor: James R. Buck, 1207 SE. 10th St., Cape Coral, Fla. 33904

[21] Appl. No.: 701,058

[22] Filed: Feb. 13, 1985

[51] Int. Cl.⁴ ............................................. B23B 13/02
[52] U.S. Cl. ...................................... 82/2.5; 82/38 R; 414/14
[58] Field of Search .................. 82/2.5, 38 R; 414/14, 414/15

[56] References Cited

U.S. PATENT DOCUMENTS

| | | | |
|---|---|---|---|
| 4,321,845 | 3/1982 | Szabo et al. | 82/2.5 |
| 4,404,878 | 9/1983 | Blanchard et al. | 82/2.5 |
| 4,464,958 | 8/1984 | Luks | 82/2.5 |
| 4,522,091 | 6/1985 | Toffolon | 82/38 R |

*Primary Examiner*—Leonidas Vlachos
*Attorney, Agent, or Firm*—Flynn, Thiel, Boutell & Tanis

[57] ABSTRACT

A bar puller for a machine tool, such as a lathe. The puller is provided with a body which mounts on the tool support so that the puller can be advanced radially toward the bar and also moved axially therealong to effect pulling. The body for the puller mounts a pair of rockers which project forwardly to effectively straddle the bar. These rockers mount rollers on the free ends thereof, the latter being provided with elastomeric surfaces to effect gripping of the bar. The body preferably has an adjustable guide pin which is moved to abut the side of the bar, thereby providing a three-point support. Springs urge the rockers inwardly toward one another so that the rollers grippingly engage the bar therebetween. When so engaged, the tool support is moved axially of the machine to effect the desired pulling of the bar.

8 Claims, 3 Drawing Figures

SIDEWARD-LOCATED BAR PULLER

FIELD OF THE INVENTION

This invention relates to an improved bar puller adapted to be mounted on a machine tool, such as a lathe, which bar puller is particularly desirable for use in pulling either a short bar cut close to the machine or a bar which must be pulled up against a center on the tailstock of the machine.

BACKGROUND OF THE INVENTION

The forward advancing of a workpiece, specifically a bar or rod, through a lathe to permit sequential working operations to be performed has generally been accomplished using a push-type mechanism, commonly referred to as a bar pusher. The standard bar pusher typically comprises a sleevelike steel element formed substantially as a collet. This standard bar pusher is normally positioned on the rearward or backside of the lathe so as to engage the workpiece and push same forwardly. However, due to the size and mass of the bar being advanced, which bar may be as much as 12 feet in length, each stoppage of the pusher results in imposition of a substantial impact force on the lathe, and hence this significantly increases the wear and tear on the lathe.

To avoid the use of a spring steel collet as a pusher, another bar pusher has been developed which utilizes a steel-kept rubber insert captivated within a finger sleeve, which rubber insert is squeezed to deform same into gripping engagement with the bar so as to permit gripping engagement therewith and hence advancing of the bar. This known pusher, as illustrated by U.S. Pat. No. 2 426 200, is again positioned on the backside of the lathe collet. This pusher is also of undesirable axial length, and cannot be easily manually adjusted.

While bar pushers for advancing the bar or workpiece have been conventional and well known for many years, nevertheless the known bar pushers do cause excessive wear on the machine, and are relatively expensive in view of the requirement that they be positioned on the backside of the lathe collet. Due to the recognized disadvantages of the conventional bar pushers, one manufacturer, Advance Tool Systems, has developed a bar puller which mounts on the front side of the machine. In particular, this known bar puller mounts on the turret of a lathe, and hence can be advanced into engagement with the bar, and then retracted to permit advancing of the bar stock. This bar puller, however, requires that it be aligned with and movable into engagement with the free end of the bar to effect pulling thereof, and this hence makes the puller unusable in many environments, such as when the projecting bar is cut extremely close to the machine tool and has a very small projection, or when the bar must be moved into engagement with a center on the machine tailstock.

Applicant has also developed a bar puller which employs a sleeve, in this case an elastomeric sleeve, which moves coaxially into engagement with the free end of the bar to then effect pulling thereof. Applicant's earlier bar puller, as disclosed in copending application Ser. No. 519,630 file date Aug. 2, 1983, hence requires that it be coaxially moved into engagement with the free end of the bar in much the same manner as the bar puller manufactured by Advance Tool Systems, as described above.

Accordingly, the present invention relates to an improved bar puller which can be utilized to perform a desirable bar pulling operation in situations where prior known pullers cannot be successfully utilized. For example, in many instances a bar is cut off in close proximity to the lathe collet, so that only an extremely small length of bar projects from the machine collet. Known bar pullers generally cannot successfully engage the small projecting end of the bar so as to effect advancing thereof. In other situations the bar must be pulled outwardly of the headstock through a sufficient extent until the bar engages a center on the tailstock. Again, the known pullers which employ a sleeve which moves coaxially into engagement with the free end of the bar are hence wholly unsuitable for this type operation since they have no capability of being released from the bar after it is moved into engagement with the center of a tailstock. The improved bar puller of this invention is able to successfully pull a bar through a machine tool under use conditions similar to those outlined above, and hence this improved bar puller thus permits successful and efficient pulling of a bar under conditions which, when using known bar pullers, was either not possible or could be accomplished only with difficulty or only with consequent damage to the bar.

In the improved bar puller of this invention, the puller is provided with a body which mounts on the tool support so that the puller can be advanced radially toward the bar and also moved axially therealong to effect pulling. The body for the bar puller mounts thereon a pair of levers or rockers which project forwardly so as to effectively straddle the bar. These rockers mount rollers on the free ends thereof, the latter being provided with elastomeric gripping surfaces to effect gripping of the bar therebetween on approximately diametrically opposite sides. The support body for the puller preferably has an adjustable guide pin which is moved so as to abut the side of the bar, thereby providing a three-point support for the bar. Springs appropriately urge the rockers inwardly toward one another so that the rollers grippingly engage the bar therebetween. When so engaged, the tool support is moved axially of the machine to effect the desired pulling of the bar. The rollers are positioned so that they can engage only a short projecting end of the bar, and can also move the bar up against the center of a tailstock. When the pulling has been complete, the tool support is moved radially away from the bar, thereby retracting the rollers from their straddling engagement with the bar.

Other objects and purposes of the invention will be apparent to persons familiar with structures of this general type upon reading the following specification and inspecting the accompanying drawings.

Figure 1:
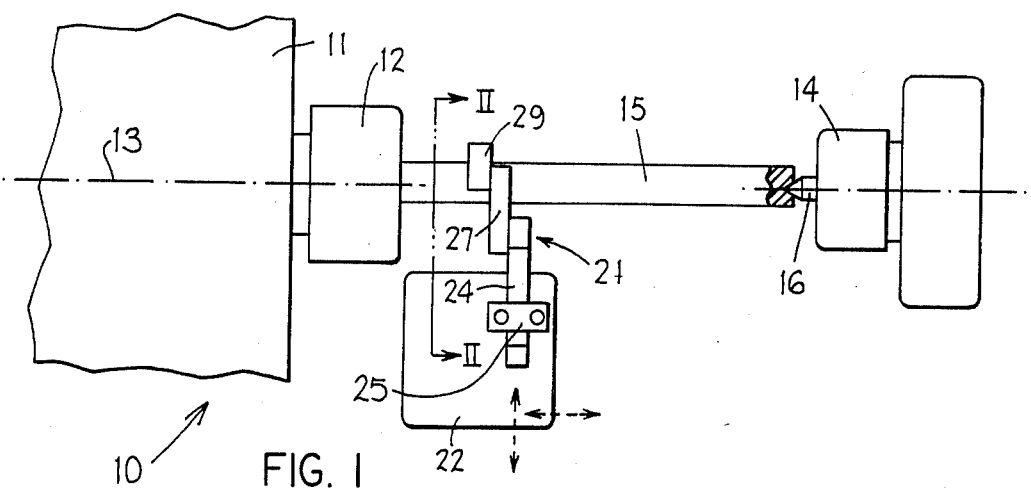
FIG. 1 is a diagrammatic, fragmentary illustration of a turret lathe having a bar puller according to the present invention mounted thereon.

Certain terminology will be utilized in the following description for convenience in reference only, and will not be limiting. For example, the words "upwardly", "downwardly", "rightwardly" and "leftwardly" will refer to directions in the drawings to which reference is made. The words "front" and "forward" will have reference to the end of the bar puller appearing on the right side of FIG. 2, and movement thereof in a direction toward the bar. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Figure 2:
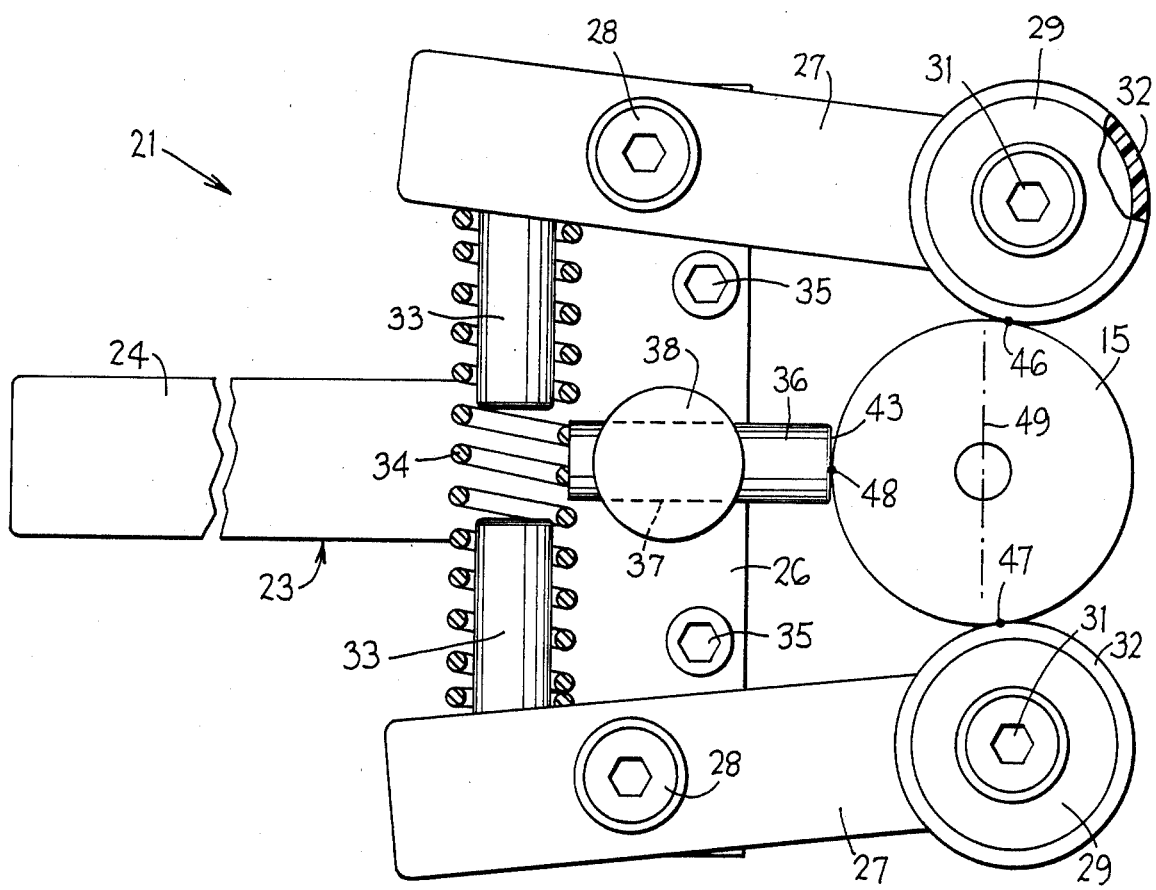
FIG. 2 is an enlarged, partial sectional view of the improved bar puller of the present invention, same being taken substantially along line II—II in FIG. 1.
Figure 3:
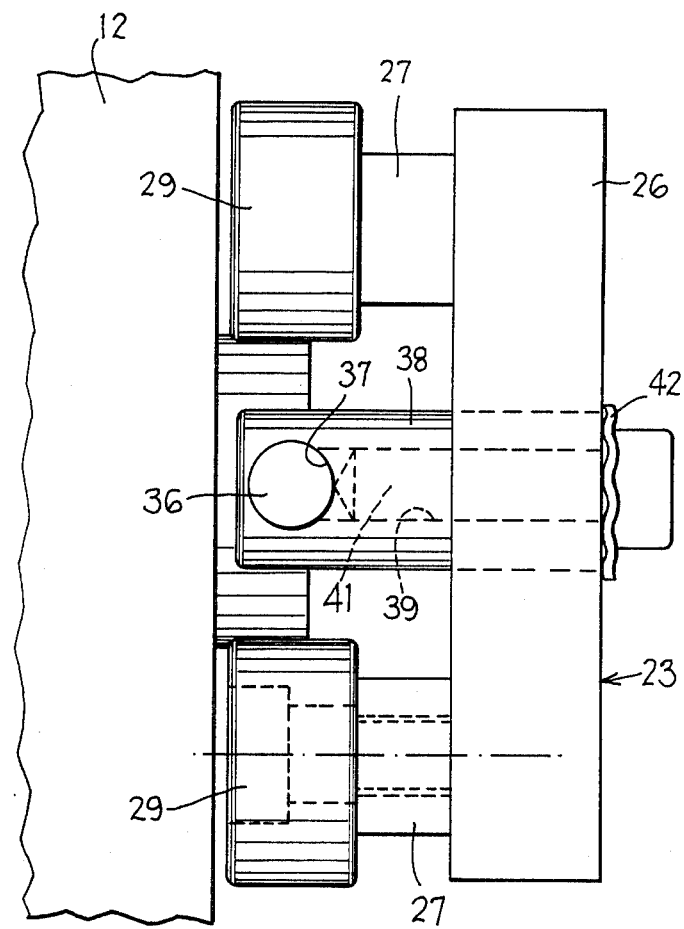
FIG. 3 is a fragmentary front view of the bar puller as appearing in FIG. 2.

The improved bar puller of this invention, as illustrated in greater detail in FIGS. 2 and 3, is intended for mounting on a machine tool, such as a turret lathe 10 as diagrammatically illustrated in FIG. 1.

The lathe 10 includes a housing 11 on which a rotatable headstock 12 is mounted, which headstock has a conventional chuck or collet which is rotatable about the axis 13. The headstock is designed for gripping engagement with an elongate workpiece such as a bar or rod 15 which extends through and projects outwardly from the headstock so as to permit selected machine operations to be carried out thereon. The lathe 11, in the illustrated embodiment, may also include a tailstock 14 provided with a center 16 which is adapted for supportive engagement with the exposed end of the bar 15 when machining on long sections of the workpiece is desired. Lathe 11 also conventionally has a tool support 22 which is adapted to have a cutting tool mounted thereon, the tool support 22 being supported for movement radially toward and away from the bar 15 and axially therealong, so as to permit the desired machine operations to be performed. The structure of the lathe 10 is conventional so that further detailed description and illustration thereof is believed unnecessary.

To effect pulling of the bar 15 axially outwardly from the headstock 12, the lathe can be provided with the bar puller 21 according to the present invention, which bar puller is mounted on the tool support 22 as diagrammatically illustrated in FIG. 1.

The bar puller 21, as illustrated in FIGS. 2 and 3, includes a main T-shaped body 23 which has a stem part 24 for permitting attachment of the puller to the tool support 22, such as by means of a clamp 25. The stem part 24 of body 23 terminates in a transversely extending head part 26, which head part normally is oriented so as to extend vertically in perpendicular relationship to the longitudinal axis of the bar 15. This head part 26 mounts thereon, adjacent the opposite ends thereof, a pair of levers or rockers 27, the latter being pivotally supported on the head part 26 at a location intermediate the length of the rockers by means of pivot shafts or bolts 28. Each rocker 27 projects forwardly a substantial distance beyond the head part 26 and has a roller 29 rotatably supported thereon by a pivot bolt or shaft 31. The roller 29 is preferably provided with a coating or tread 32 of elastomeric material around the cylindrical peripheral surface thereof. This coating 32 is normally rather thin, such as in the neighborhood of ⅛ inch thick, and is preferably of polyurethane.

Rockers 27 have the rearward ends thereof projecting rearwardly from the pivots 28, which rearward ends have guide pins or studs 33 fixed thereto and projecting sidewardly therefrom so that the studs 33 on the pair of rockers are directed generally toward one another. A conventional coil-type compression spring 34 extends between the rearward ends of the rockers, with the ends of the spring being seated around the studs 33, whereby the spring 34 hence continuously urges the rearward ends of the rockers 27 outwardly away from one another. This in turn causes the rollers 29 to be continuously biased inwardly toward one another. The inward swinging movement of the rollers 29, and of the rockers 27, is limited by a pair of stops 35 which are fixedly secured to the head part. When the bar puller is disengaged from a bar, then the spring 34 normally urges the rockers 27 inwardly into a position wherein they abut the stops 35, in which position a normal minimum separation distance is maintained between the rollers 29, which separation distance is less than the diameter of the bar 15.

The bar puller also mounts thereon a slidable stop pin 36, which pin has a transverse front end surface 43 which is adapted for contact with the bar 15. This stop pin 36 projects in a direction radially toward the bar 15 and extends through an opening or bore 37 formed in a support post 38, the latter being fixedly secured to and projecting sidewardly from the head part 26 at a location disposed intermediate the rockers 27. A threaded opening 39 extends inwardly from the opposite side of the head part 26 and coaxially of the support post 38 for communication with the opening 37. A conventional headed set screw 41 extends through this opening 39 so that the tip of the set screw engages the stop pin 36 so as to secure the latter in its selected adjusted position. By loosening this set screw 41, the pin 36 can be slidably displaced forwardly or rearwardly relative to the bar puller so as to adjust its point of contact with the bar 15. The set screw 41 is preferably provided with a conventional spring washer 42 disposed under the head thereof so as to securely hold the set screw in its locking position.

OPERATION

While operation of the bar puller 21 according to this invention is believed apparent from the description given above, nevertheless same will be briefly described to ensure a complete understanding thereof.

When a bar 15 is to be advanced through the headstock 12 for engagement with the center 16 of the tailstock 14, the tool support 22 is moved radially inwardly toward the bar 15. This causes the rollers 29 to rollingly engage the bar 15 and hence swing outwardly away from one another in opposition to the urging of the spring 34 depending upon the diameter of the bar 15. The tool support 22 is preferably moved inwardly until the guide pin 36 contacts the side of the bar 15 substantially at the contact point 48. At this time, the rollers 29 have rolled partially around the bar so that the treads 32 on the rollers hence contact the bar 15 at two additional spaced contact points 46 and 47, the latter preferably being slightly past the vertical central plane 49 of the bar. The rollers 29 and the guide pin 36 hence define a three-point triangular engagement with the bar 15. In addition, since the treads 32 on the rollers 29 are of an elastomeric material, such as polyurethane, the rollers hence do not mark or damage the surface of the bar, and at the same time create a good gripping engagement with the bar. Thereafter, the tool support 22 is moved axially, carrying with it the bar puller 21, and hence causing the bar 15 to be moved axially forwardly until the free end thereof engages the center 16. Tool support 22 is then moved radially outwardly, whereupon the rockers 27 are withdrawn so that the rollers 29 rollingly move around the bar and are then moved radially away from the bar out of engagement therewith.

The above describes operation of the bar puller when a bar is being moved into engagement with the center of a tailstock. However, the bar puller is also particularly desirable for engaging the free end of a bar when the bar projects only a short distance out from the headstock. For example, as illustrated in FIG. 3, the bar 15' projects outwardly only a short distance beyond the headstock 12. With the bar puller 21 of this invention, the rollers 29, since they are mounted in a cantilever fashion adjacent one side of the rockers 27, can hence be moved into gripping engagement with the short projecting end of the bar 15', following which the bar puller can hence be displaced axially so as to effect forward axial displacement of the bar 15'.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a machine tool for working on an elongated barlike workpiece, said machine tool including a headstock having workpiece-holding means for axially holding and rotating said workpiece so that the free end of said workpiece projects outwardly beyond the front face of the workpiece-holding means, a tailstock disposed for supportive engagement with the free end of said workpiece, and pulling means mounted on said machine tool for engaging the workpiece and axially advancing same forwardly into engagement with the tailstock, the machine tool also including a support which is disposed adjacent the region between the head and tailstocks and is movable both radially toward and away from the workpiece and axially therealong, said pulling means comprising:
    a body mounted on said support and projecting generally toward said workpiece, a pair of levers pivotally mounted on said body for independent swinging movement about pivot axes which are sidewardly spaced apart in parallel relationship and which extend generally parallel to the longitudinal axis of the workpiece, said levers projecting outwardly generally toward the workpiece and terminating in free ends which are spaced apart, each said lever having a roller mounted thereon adjacent the respective free end thereof for rotation about an axis which is generally parallel to the pivot axis, said rollers having a tread of an elastomeric material adapted for rolling engagement with the external surface of the workpiece, and spring means for normally urging the levers in a direction tending to move said rollers toward one another, said support movably displacing said puller from a retracted position wherein the rollers are spaced radially from the workpiece into an advanced position wherein the rollers are engaged with the exterior surface of the workpiece on approximately diametrically opposite sides thereof.

2. A combination according to claim 1, wherein the puller includes a guide pin mounted on the body at a location disposed between said rollers, said guide pin having an end surface adapted for engagement with the exterior surface of the workpiece when the support is in said advanced position, said end surface on said guide pin being spaced rearwardly from said rollers so that the guide pin and rollers create three points of contact when engaged with the workpiece.

3. A combination according to claim 2, wherein said body is generally T-shaped and has a stem part which is secured to and projects forwardly from the support, said body having a head part which extends vertically and perpendicularly with respect to the stem part adjacent the forward end of the latter, said levers being pivotally supported on said head part adjacent the upper and lower ends thereof, said levers projecting forwardly from said head part so that said rollers are spaced forwardly a substantial distance therefrom, and said guide pin being slidably supported on and projecting forwardly from said head part at a location which is disposed vertically between said pair of levers.

4. A combination according to claim 3, wherein said levers include rear portions which project rearwardly from the pivot axes, said rear portions having support stems fixed thereto and projecting sidewardly therefrom in substantially opposed relationship to one another, and said spring means including a coil-type compression spring extending between the rear portions of said levers and having the ends thereof guided and supported by said stems.

5. A bar puller for use on a machine tool for engaging and pulling on a bar for advancing the latter axially of the machine tool, said bar puller comprising:
    a support body having a first part adapted for securement to the machine tool and a second part fixedly secured to the first part;
    first and second levers pivotally supported on said second part for swinging movement about substantially parallel axes, said levers projecting outwardly from said second part substantially beyond said axes so that the levers project generally in the same direction, said levers projecting outwardly and terminating in free ends;
    a roller rotatably supported on each of said levers adjacent the free end thereof, each said roller being supported for rotation about an axis which is substantially parallel to the pivot axis, the roller having a tread of an elastomeric material extending therearound;
    spring means coacting with said levers for urging them to swing inwardly toward one another for tending to move the rollers toward one another;
    stop means mounted on said body and cooperating with said first and second levers for limiting the inward swinging thereof; and
    a workpiece-engaging stop member mounted on said second part substantially midway between said first and second levers, said stop member having a stop surface thereon adapted to define a first point of contact with the workpiece, said pair of rollers defining a further pair of contact points with a workpiece, said latter pair of contact points defining a plane which is spaced forwardly a substantial distance from said stop face so that the bar puller defines three contact points disposed in a triangular arrangement for supportive engagement with the workpiece.

6. A bar puller according to claim 5, wherein the stop member comprises a pin which is slidably supported on said second part for slidable movement in a direction which is perpendicular to said pivot axis and extends generally in the elongated direction of said levers.

7. A bar puller according to claim 6, wherein said body is of a generally T-shaped configuration and includes a stem portion defining said first part and a head portion defining said second part, said head portion extending vertically and perpendicularly with respect to said stem portion, said first and second levers being pivotally supported on said head portion adjacent the upper and lower ends thereof, said pivot axes extending substantially horizontally.

8. In combination, a machine tool for working on an elongated barlike workpiece, said machine tool including a headstock having workpiece-holding means for axially holding and rotating said workpiece so that the free end of said workpiece projects outwardly beyond the front face of the workpiece-holding means, a tailstock disposed for supportive engagement with the free end of said workpiece, and pulling means mounted on said machine tool for engaging the workpiece and axially advancing same forwardly into engagement with the tailstock, the machine tool also including a support which is disposed adjacent the region between the head and tailstocks and is movable both radially toward and away from the workpiece and axially therealong, said pulling means comprising:

a body mounted on said support and projecting generally toward said workpiece, a pair of levers pivotally mounted on said body for independent swinging movement about pivot axes which are sidewardly spaced apart in parallel relationship, said levers projecting outwardly generally toward the workpiece and terminating in free ends which are spaced apart, each said lever having a roller mounted thereon adjacent the respective free end thereof for rotation about an axis which is generally parallel to the pivot axis, said rollers having a tread adapted for rolling engagement with the external surface of the workpiece, and spring means for normally urging the levers in a direction tending to move said rollers toward one another, said support movably displacing said puller from a retracted position wherein the rollers are spaced radially from the workpiece into an advanced position wherein the rollers are engaged with the exterior surface of the workpiece on approximately diametrically opposite sides thereof.

* * * * *